(12) United States Patent
Inui et al.

(10) Patent No.: US 7,979,855 B2
(45) Date of Patent: Jul. 12, 2011

(54) IMAGE PROCESSING APPARATUS, MANAGEMENT SYSTEM, AND COMPUTER PROGRAM PRODUCT

(75) Inventors: Kazuo Inui, Itami (JP); Atsushi Tomita, Toyohashi (JP); Yoshikazu Ikenoue, Itami (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 483 days.

(21) Appl. No.: 10/327,961

(22) Filed: Dec. 26, 2002

(65) Prior Publication Data

US 2003/0131083 A1    Jul. 10, 2003

(30) Foreign Application Priority Data

Dec. 28, 2001  (JP) ................................. 2001-400200

(51) Int. Cl.
*G06F 9/44* (2006.01)
*G06F 9/445* (2006.01)
*G06F 15/177* (2006.01)

(52) U.S. Cl. ........ 717/173; 717/115; 717/177; 717/178; 709/221

(58) Field of Classification Search .................. 717/167, 717/168, 171; 713/164; 709/220, 250
See application file for complete search history.

(56) References Cited

U.S. PATENT DOCUMENTS

| 5,502,797 | A  | * | 3/1996  | Bush et al. | 358/1.16 |
| 5,620,264 | A  | * | 4/1997  | Kagita | 400/74 |
| 5,623,604 | A  | * | 4/1997  | Russell et al. | 717/167 |
| 6,167,567 | A  | * | 12/2000 | Chiles et al. | 717/173 |
| 6,446,260 | B1 | * | 9/2002  | Wilde et al. | 717/173 |
| 6,467,087 | B1 | * | 10/2002 | Yang | 717/168 |
| 6,601,212 | B1 | * | 7/2003  | Guha et al. | 714/776 |
| 6,694,376 | B1 | * | 2/2004  | Ohara | 709/250 |
| 6,915,337 | B1 | * | 7/2005  | Motoyama et al. | 709/220 |
| 6,990,659 | B1 | * | 1/2006  | Imai | 717/171 |
| 7,107,588 | B2 | * | 9/2006  | Gentry | 717/176 |
| 7,266,818 | B2 | * | 9/2007  | Pike et al. | 717/176 |
| 2002/0073304 | A1 | * | 6/2002 | Marsh et al. | 713/1 |
| 2002/0100036 | A1 | * | 7/2002 | Moshir et al. | 717/173 |
| 2002/0152292 | A1 | * | 10/2002 | Motoyama et al. | 709/223 |
| 2003/0025927 | A1 |   | 2/2003  | Hino et al. | |

(Continued)

FOREIGN PATENT DOCUMENTS

EP           1 003 307 A2       5/2000

(Continued)

OTHER PUBLICATIONS

Japanese Office Action, with English-language Translation, dated Mar. 13, 2007.

*Primary Examiner* — Thuy Dao
(74) *Attorney, Agent, or Firm* — Buchanan Ingersoll & Rooney PC

(57) ABSTRACT

An image processing apparatus, a management system and a computer program product are disclosed that enable firmware that controls operations of the image processing apparatus to be updated appropriately, even when, for example, an initial setting in the image processing apparatus has been changed. Firmware in the image processing apparatus is stored in a rewritable storage device such as a flash ROM, and is updated by transmitting a new firmware to the image processing apparatus and rewriting the contents of the storage device. The new firmware is transmitted together with a control program (including script) that describes processing to be executed in the image processing apparatus before and/or after updating the firmware.

25 Claims, 15 Drawing Sheets

U.S. PATENT DOCUMENTS

| | | | |
|---|---|---|---|
| 2003/0028766 A1* | 2/2003 | Gass et al. | 713/164 |
| 2003/0035124 A1 | 2/2003 | Tomita et al. | |
| 2003/0035132 A1 | 2/2003 | Tomita et al. | |
| 2003/0035139 A1 | 2/2003 | Tomita et al. | |
| 2003/0041127 A1* | 2/2003 | Turnbull | 709/220 |
| 2003/0063305 A1* | 4/2003 | McIntyre | 358/1.13 |
| 2003/0065723 A1* | 4/2003 | Kumhyr et al. | 709/206 |
| 2003/0101288 A1* | 5/2003 | Tague et al. | 709/321 |

FOREIGN PATENT DOCUMENTS

| | | |
|---|---|---|
| JP | 09-325904 | 12/1997 |
| JP | 10-283167 | 10/1998 |
| JP | 11-212891 | 8/1999 |
| JP | 2000 222311 | 8/2000 |
| JP | 2001-22572 | 1/2001 |
| JP | 2001-350684 A | 12/2001 |

* cited by examiner

FIG.6

| APPARATUS ID | CONTROL MODULE ID | E-MAIL ADDRESS | COMPRESSED FILE NAME | FIRMWARE FILE NAME | PRE-UPDATE SCRIPT FILE NAME | POST-UPDATE SCRIPT FILE NAME | OTHER INFORMATION |
|---|---|---|---|---|---|---|---|
| 1 | 1 | device1@cust1.com | Firmwr1.lzh | Firmwr1.dat | Bscript1.txt | Ascript1.txt | ... |
| 1 | 2 | device1@cust1.com | Firmwr1.lzh | Firmwr2.dat | | Ascript2.txt | ... |
| 1 | 3 | device1@cust1.com | Firmwr1.lzh | Firmwr3.dat | Bscript3.txt | | ... |
| 1 | 4 | device1@cust1.com | Firmwr1.lzh | Firmwr4.dat | | | |
| 2 | 1 | device2@cust1.com | Firmwr2.lzh | Firmwr5.dat | | | |
| ... | | ... | ... | | ... | ... | ... |

FIG.8

HEADER
- From: abc123@service_center.com
- To: device1@cust1.com
- Date:10 Jan 01 13:18:43 +0900
- Subject: model1_1_v10
- MIME-Version: 1.0
- Content-Type:multipart/mixed;boundary="5kvrZF/hrA"
- Content-Description:Firmware

↕ BLANK (NULL LINE)

BODY
--5kvrZF/hrA
Content-Type:application/octet-stream;name=Firmwr1.lzh
Content-Transfer-Encoding:base64

AXAAABQAAAMAAQ9RAQoNEgAAAAAAXAAABQAAAM
AAQ9RAIAAAAHgAAAAAHgAVOMDZAdGRLm1pbm9sdGEuY
28uanAKAA
⋮
ImBBADEAAWVwbmVOMDZAdGRjLm1pbm9sdGEuY28uanA
KAAAXAAABQAAAMAAQ9RAQoNEgAAAAAHgAAAAAHgA
QoNEgAAAAA =

--5kvrZF/hrA--

FIG.15

HEADER
- From: abc123@service_center.com
- To: device@cust1.com
- Date:10 Jan 01 13:18:43 +0900
- Subject: model1_1_v10(1/4)
- MIME-Version: 1.0
- Content-Type:multipart/mixed:boundary="5kvrZF/hrA"
- Content-Description:Firmware

↕ BLANK (NULL LINE)

BODY
- --5kvrZF/hrA
- Content-Type:application/octet-stream;name=Firmwr1.lzh
- Content-Transfer-Encoding:base64

AXAAABQAAAMAAQ9RAQoNEgAAAAAAXAAABQAAAM
AAQ9RAIAAAAHgAAAAAHgAVOMDZAdGRLm1pbm9sdGEuY
28uanAKAA
⋮
ImBBADEAAWVwbmVOMDZAdGRjLm1pbm9sdGEuY28uanA
KAAAXAAABQAAAMAAQ9RAQoNEgAAAAAHgAAAAAHgA
QoNEgAAAAA =

--5kvrZF/hrA--

IMAGE PROCESSING APPARATUS, MANAGEMENT SYSTEM, AND COMPUTER PROGRAM PRODUCT

This application is based on Patent Application No. 2001-400200 filed in Japan, the contents of which is hereby incorporated by reference.

BACKGROUND OF THE INVENTION (1) Field of the Invention

The present invention relates to an image processing apparatus, a management system, and a computer program product.

(2) Description of Related Art

In image processing apparatuses of recent years, operations are controlled by a computer program product (hereinafter "firmware") that includes a program, control constants, and so on. Conventionally, firmware is stored in a mask ROM in the image processing apparatus. When it becomes necessary to update the firmware for reasons such as an upgraded version having been produced, the mask ROM is replaced with a new one that stores the new firmware.

Consequently, a technician must be dispatched to the image processing apparatus to replace the mask ROM. This means that updating firmware is costly. In order to solve this problem, a technique has been devised for storing firmware in the image processing apparatus in a rewritable storage device such as a flash ROM, and updating the firmware by transmitting new firmware to the image processing apparatus via the Internet, with use of means such as e-mail.

Another issue is that there are cases where operations performed by an image processing apparatus are customized according to where the apparatus is used and the needs of the customer. For example, usually pressing a reset button on an image processing apparatus results in a particular parameter (such as the number of copies to be made) being reset to an initial setting of "1". However, this initial setting maybe customized so as to be set to "10" when the reset button is pressed.

Usually such initial setting values and the like are stored in a RAM or the like that is separate to the flash ROM in which the firmware is stored. In such a case, one problem that occurs when updating firmware by transmitting new firmware is that with the new firmware the area in the RAM that is referred to may be different to the one that stores the initial setting value, resulting in the customized contents being lost. Consequently, the initial setting must to be set again.

Furthermore, it is desirable to be able to perform some kind of processing before and/or after updating firmware. For example, if there is an error at the image processing apparatus-side before the firmware is updated, it is desirable to perform error processing before updating the firmware.

SUMMARY OF THE INVENTION

The object of the present invention is to provide an image processing apparatus, a management system, and a computer program product that are able to update firmware in the image processing apparatus appropriately, even when it is desirable to perform some kind of processing before and/or after updating the firmware.

The above-described object is achieved by an image processing apparatus being connectable to an external device through a network, including: a receiver unit which receives data from the external device; and a processor unit which updates a firmware stored in the image processing apparatus based on the received data and executes a control action before and/or after updating the firmware also based on the received data.

According to the stated structure, the control action is executed based on the received data before and/or after performing the firmware updating process. Therefore, firmware can be updated appropriately even, for example, in a case in which the firmware is customized or an error has occurred before the updating.

Note that the control action may be executed by a control program that is separate from the firmware, or may be executed by a program that is included in the firmware. Here, the control program is a program that performs device control. The control program may be a text string (including "script" described in the following embodiment) that operates using an interpreter language installed in the image processing apparatus, or may be binary data.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 6 shows one example of the contents of a transmission-destination database;

FIG. 8 is for describing the contents of an e-mail message to which firmware and the like are attached;

FIG. 15 shows the main parts of an e-mail message to which a piece of firmware that has been divided into pieces of data of a predetermined size is attached.

DESCRIPTION OF THE PREFERRED EMBODIMENTS

The following describes an embodiment of the image processing apparatus, etc. of the present invention with reference to the drawings.

(1) Overall Structure of the Image Processing Apparatus Management System

Figure 1:
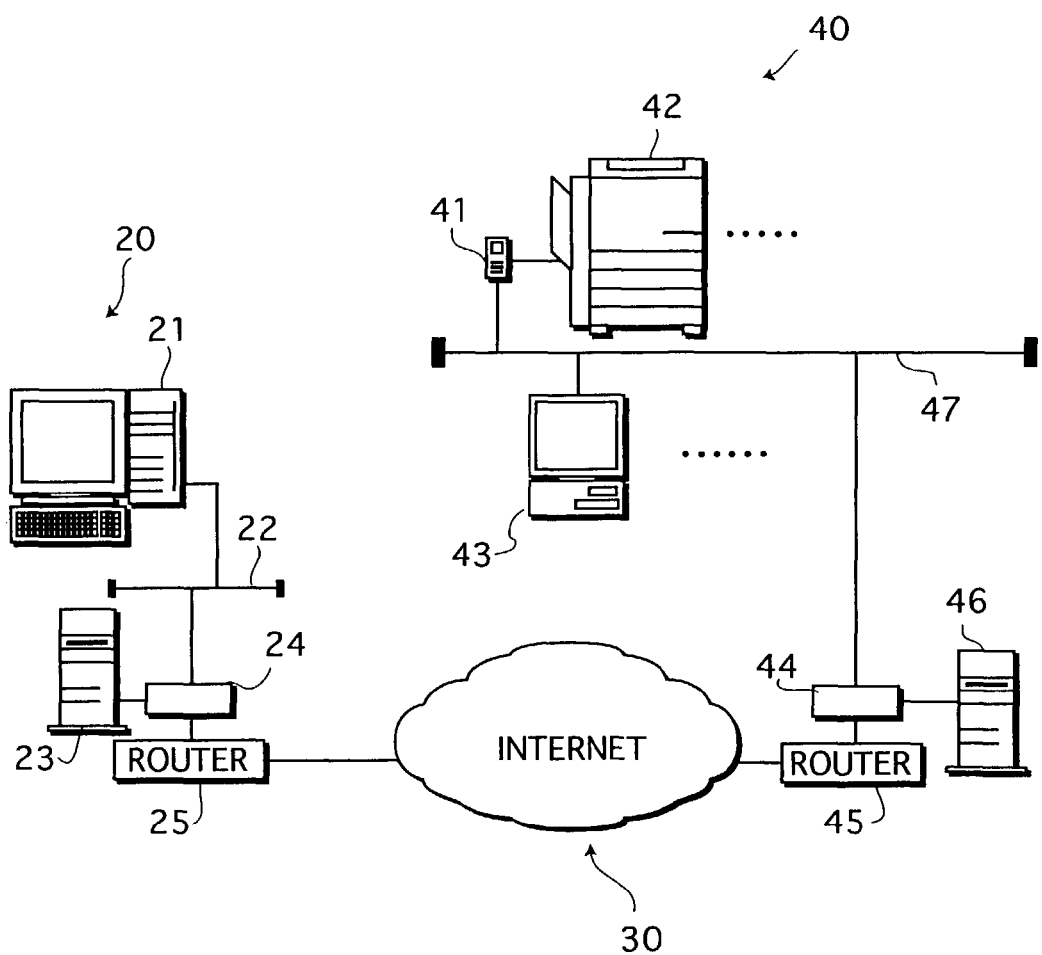
FIG. 1 shows the structure of an image processing apparatus management system in an embodiment of the present invention.

FIG. 1 shows the structure of the image processing apparatus management system (hereinafter simply called the "management system") of the present embodiment. A management system 10 in FIG. 1 is composed of a service center 20 and a user site 40 that are connected via the Internet 30.

The service center 20 transmits new firmware to the user site 40. An update process for rewriting firmware that controls the operations of an image processing apparatus to the transmitted new firmware is performed at the user site 40. In the present embodiment, the new firmware is transmitted via the Internet 30 using one or more e-mail (electronic mail) messages.

Note that the service center 20 is capable of providing image processing apparatus management services to a plurality of user sites. However, since new firmware is transmitted to all sites in the same manner, the user site 40 is described as an example in the present embodiment.

In addition to being connected to the Internet 30 via a router 25, the service center 20 is provided with a firewall 24 for security. A host computer 21 in the service center 20 is connected to the firewall 24 via a LAN (local area network) 22, and transmits and receives e-mail to and from the user sites via a mail server 23.

The user site 40 is connected to the Internet via a router 45, and is provided with a firewall 44 for security. A LAN 47 is connected to the Internet 30 via the firewall 44 and the router 45. An image processing apparatus 42, a client PC (personal computer) 43, and so on are connected to the LAN 47. It is possible for a plurality of image processing apparatuses to be connected to the LAN 47. The image processing apparatuses are connected to the LAN 47 via respectively management units. For example, the image processing apparatus 42 is connected to the LAN 47 via a management apparatus 41. This is simply one example of the structure of the user site 40: user sites are not limited to including a client PC.

A mail server 46 in the user site 40 is connected to the firewall 44, and transmits and receives e-mail to and from the client PC 43, the management unit 41 and other devices. Note that if the user site does not include a mail server, the client PC and the management unit may use an external mail server, such as that of an internet service provider.

As described later in detail, in the present embodiment a control program (hereinafter called a "script") is transmitted before and/or after the new firmware is transmitted. This script describes processing to be executed at the user site 40. Consequently, it is necessary for a user site of the present embodiment to be able to receive firmware and script with use of e-mail. One possible method of transmitting firmware and script is to use file compression software to compress a plurality of files in which the firmware and the script are respectively stored into one file, and transmit the file as an e-mail attachment. The firmware and script are not, however, limited to being transmitted according to this method.

Examples of protocols that can be used in the present embodiment to transmit and receive e-mail are SMTP (simple mail transfer protocol: RFC821, etc.), MIME (multiple internet mail extension: RFC1521, etc.), and POP3 (post office protocol version 3: RFC1725, RFC1939, etc.).

(2) Structure of the Image Processing Apparatus

The following describes the hardware structure of the image processing apparatus 42. Note that the image processing apparatus 42 is a so-called MFP (multi-functional printer) that functions as both a photocopier and a printer. However, the management system 10 in the present embodiment is capable of managing other kinds of devices such as a facsimiles, photocopiers, scanners and printers, regardless of whether they have a management unit or not.

Figure 2:
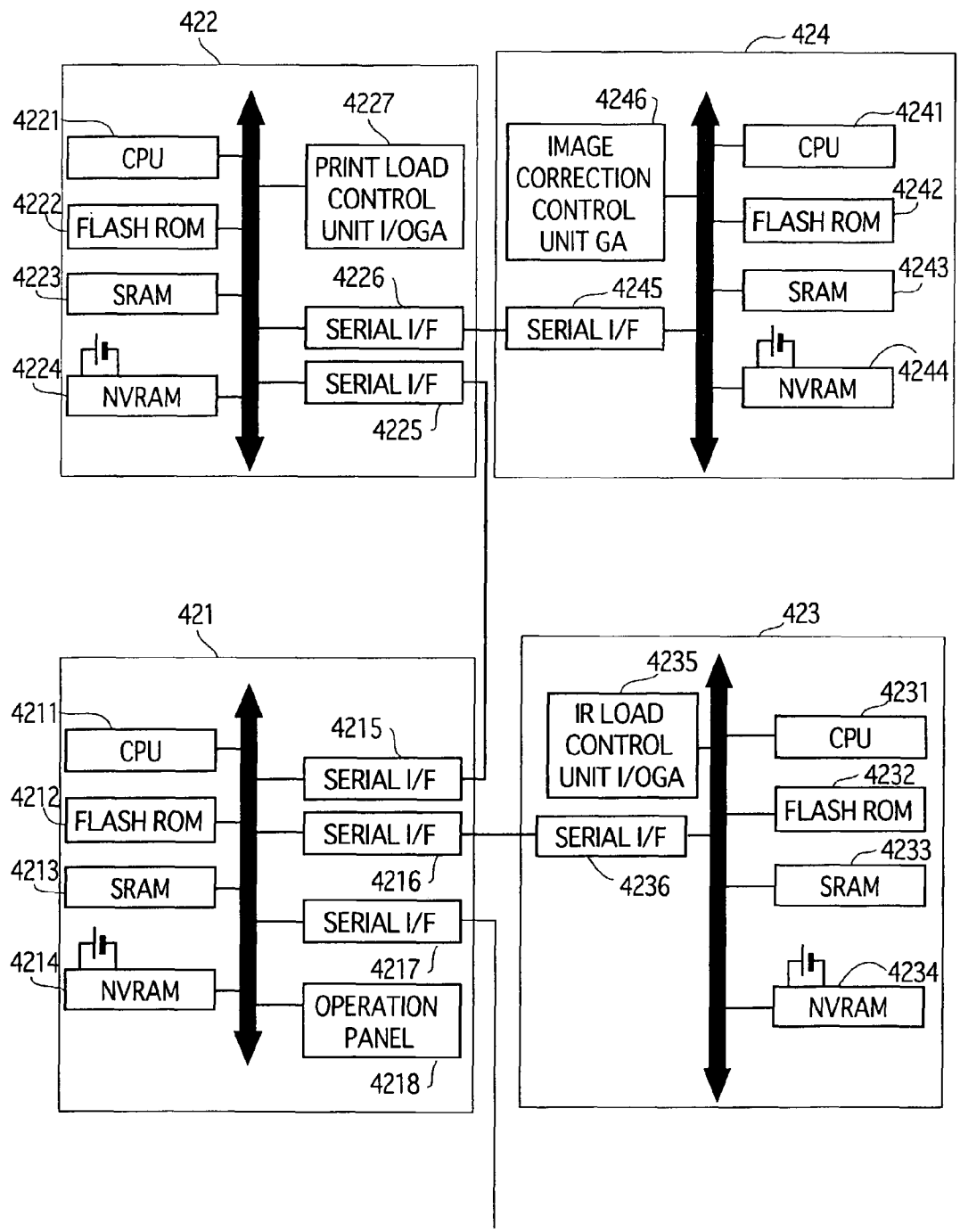
FIG. 2 shows the hardware structure of four control modules in an image processing apparatus 42 that particularly control operations of the image processing apparatus 42, and shows how the control modules are connected.

FIG. 2 shows the hardware structure of four control modules in the image processing apparatus 42 that control operations of the image processing apparatus 42 for executing firmware, and how the four modules are connected.

Each of the four control modules has its own specific role, but a similar hardware structure to the other control modules. Each control module includes a CPU, a memory and so on that are connected by an internal bus. The control modules further include I/Fs (interfaces) that communicate serially with the other control modules and that are connected to the internal bus, and, according to the individual function of the control module, a GA (gate array), etc. that are also connected to the internal bus.

In addition, a flash ROM (flash read only memory), an SRAM (static random access memory), and an NVRAM (non-volatile random access memory) are connected to each internal bus. The flash ROM stores firmware for each module. The SRAM functions as a working memory. The NVRAM stores parameters such as operation settings. The CPUs read firmware from the flash ROM, and execute processing accordingly.

The control module 421 is composed of a CPU 4211, a flash ROM 4212, an SRAM 4213 and an NVRAM 4214. Furthermore, the control module 421 includes serial I/Fs 4215 and 4216 that communicate serially with the control modules 422 and 423 respectively, and a serial I/F 4217 that communicates with the management unit 41. The serial I/Fs 4215, 4216 and 4217 are connected to the internal bus. An operation panel 4218 is under the control of the control module 421.

The control module 421 receives jobs such as print jobs, copy jobs and firmware update jobs via the management unit 41 and the operation panel 4218. Furthermore, the control module 421 performs overall control, its functions including allocating processing necessary for executing a job to the other control modules 422, 423 and 424, and instructing the order and timing of various types of processing.

The control module 422 has a similar hardware structure to the control module 421. Specifically, the control module 422 includes a CPU 4221, a flash ROM 4222, and SRAM 4223 and an NVRAM 4224 that are connected to an internal bus, and serial I/Fs 4225 and 4226 that communicate serially with control modules 421 and 424 respectively. The control module 422 also includes a print load control unit I/OGA 4227 that control the print load.

Based on instructions from the control module 421, the control module 422 controls illuminating of a laser diode and operations of a polygon mirror and a carry roller as required for actions for forming a latent image on a photosensitive drum, developing the image and transferring the resulting toner image to a recording sheet, fixing the toner image, and outputting the recording sheet.

The control module 423 also has a structure in which its CPU 4231 and so on are connected to an internal bus, and includes an I/R load control unit I/OGA 4235 for controlling operations of an image reader (I/R) for reading document images. In addition, the control module 423 includes a serial I/F 4236 that is for communicating with the control module 421, and is connected to the internal bus.

The control module 423 controls, via the I/R load control unit I/OGA 4235, a carry motor for carrying a document, a driver motor for driving the image reader, illumination of a lamp for illuminating the surface of the document, and so on. This control is executed according to control instructions issued by the control module 421 based on instructions input using the operation panel 4218.

The control module 424 also has a structure in which its CPU 4241 and so on are connected to an internal bus, and includes a serial I/F 4245 for communicating with the control module 422. In addition, the control module 424 includes an image correction control unit GA 4246 that is connected to the internal bus. The control module 424 executes its individual functions under the control of the CPU 4241.

Specifically, the control module 424 receives image data relating to a print job from the control module 421, or receives image data relating to a copy job from the control module 423, applies image processing such as shading correction and ν correction to the received image data, and has the control module 422 print out the image.

(3) Structure of the Management Unit 41

The following describes the structure of the management unit 41. Note that it is possible for the management unit 41 to be external to the image processing apparatus, or for functions corresponding to the management unit 41 to be included in the image processing apparatus. Here, an example of the management unit 41 being external to the image processing apparatus 42 is described.

Figure 3:
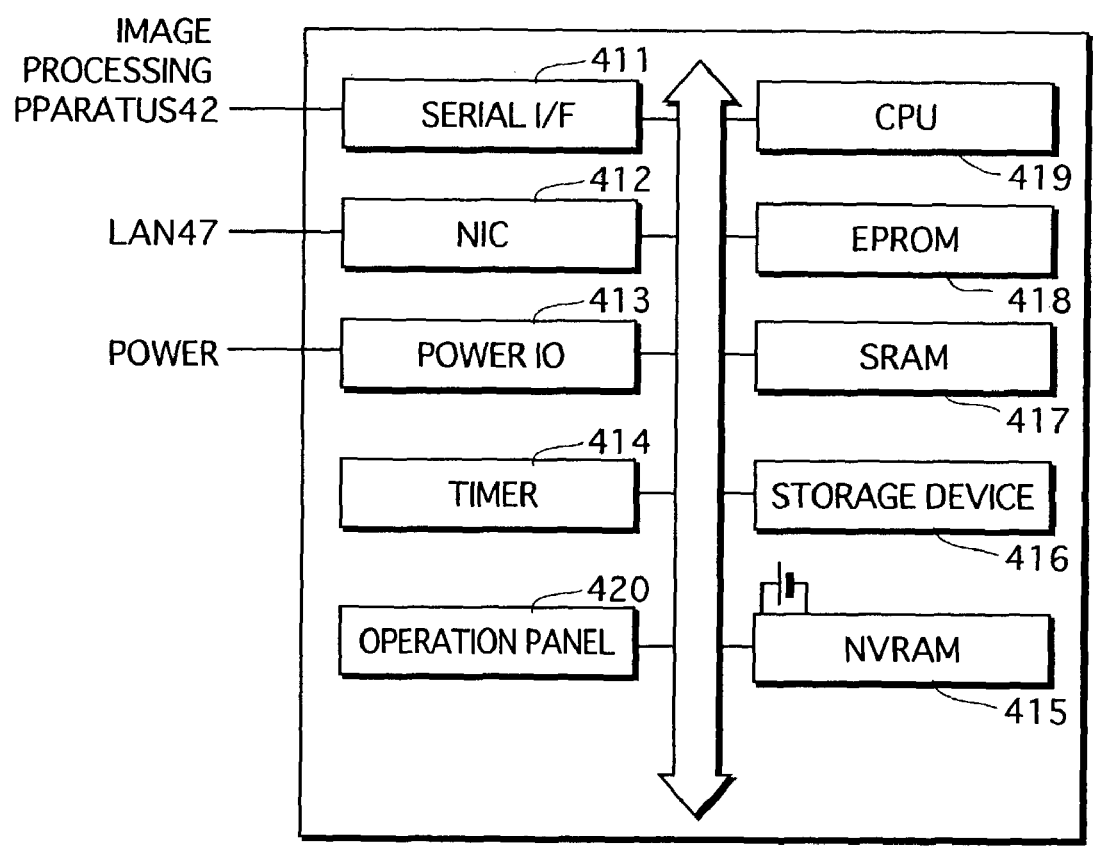
FIG. 3 shows the structure of a management unit 41.

FIG. 3 shows the structure of the management unit 41. As FIG. 3 shows, the management unit 41 is composed of an EPROM 418, an SRAM 417 and an NVRAM 415, which are connected to the internal bus. The EPROM 418 stores a control program. The SRAM 417 is a working memory. The NVRAM 415 stores various setting values and the like. A CPU 419 reads the control program, and executes processing accordingly.

Note that the settings stored by the NVRAM 415 include the respective IP addresses of the management unit 41 and the mail server 46, and the account name and password that are required when downloading e-mail from the mail server 46.

An NIC (network interface card) 412 is also connected to the internal bus. The NIC 412 is connected to the Internet 30 via a LAN 47 and so on, and transmits and receives e-mail. Furthermore, a serial I/F 411 is connected to the internal bus. The serial I/F 411 and the serial I/F 4217 in the control module 421 are connected by a serial cable (cross type).

A power IO 413 that is also connected to the internal bus is an IO that controls an electromagnetic switch that turns power supply to the image processing apparatus 42 on and off to reboot the image processing apparatus 42. Note that an alternative method of rebooting the image processing apparatus 42 is for the CPUs 4211, 4221, 4231 and 4241 in the control modules to include respective reset elements that have the image processing apparatus 42 rebooted.

The management unit 41 also includes a storage device 416 for temporarily storing image data for print jobs and firmware for firmware updating jobs. Note that the storage device 416 is connected to the internal bus via a storage device connection I/F (not illustrated). The CPU 419 accesses the storage device 416 by instructing the storage device connection I/F.

The management unit 41 further includes a timer 414 which is used, for example, to obtain timing for accessing the mail server 46 to check for and download e-mail, and detect timeouts necessary for packet retransmission according to TCP (transmission control protocol), which is a protocol under SMTP, POP3 and the like that are used for transmission and reception of e-mail.

Furthermore, the management unit 41 includes an operation panel 420, which in the present embodiment is a color LCD touch-panel. The management unit 41 is able to receive setting inputs and perform error display with use of the operation panel 420.

(4) Structure of the Host Computer 21

The following describes the structure of the host computer 21 that is provided at the service center 20, and controls image processing apparatuses at the user site 40 and so on. Note that although a single processor structure is described here, a multiprocessor structure may be used in cases, for example, when the host computer 21 manages multiple image processing apparatuses.

Figure 4:
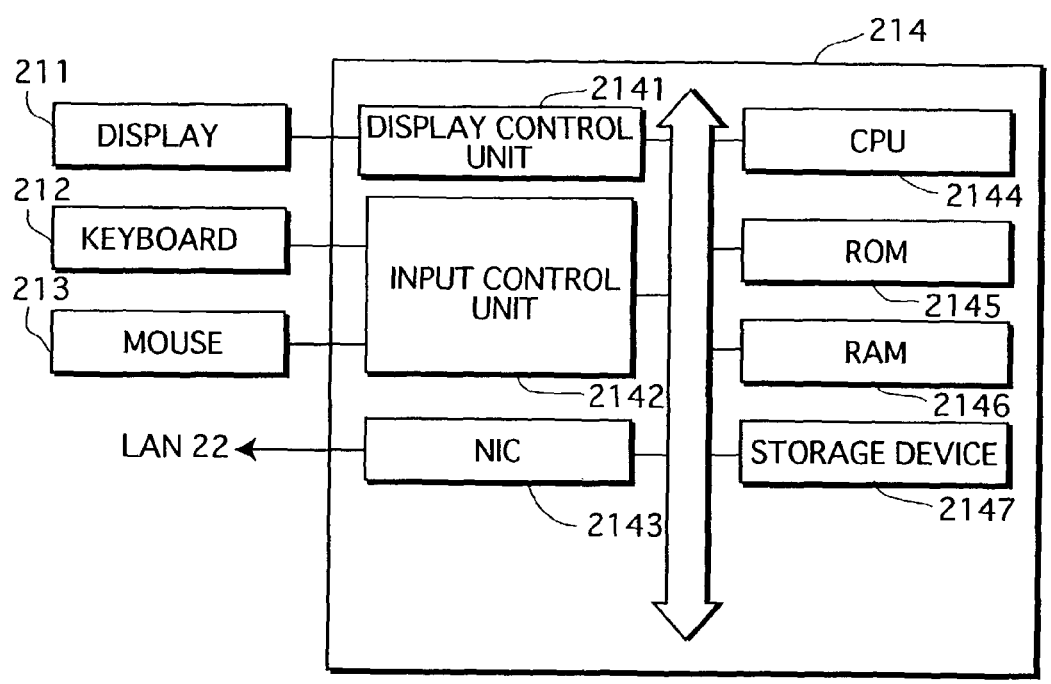
FIG. 4 shows the structure of a host computer 21.

FIG. 4 shows the structure of the host computer 21. As FIG. 4 shows, the host computer 21 is composed of a computer unit 214, and peripheral devices that are attached to the computer unit 214. Specifically, the peripheral devices are a display 211, a keyboard 212 and a mouse 213. The computer unit 214 includes a CPU 2144, a ROM 2145, and a RAM 2146 that are connected to an internal bus.

The computer unit 214 includes a display control unit 2141, an input control unit 2142, and an NIC 2143 that are connected to the internal bus, and that are connection interfaces with the peripheral devices. Specifically, the display control unit 2141 outputs images to the display 211, the input control unit 2142 receives input from the keyboard 212 and the mouse 213, and the NIC 2143 connects to the LAN 22.

A storage device 2147 is connected to the internal bus via a interface unit (not illustrated). In addition to storing a transmission-destination database, the storage device 2147 stores firmware and script to be transmitted. In the present embodiment, the transmission-destination database stores information including the e-mail address of each image processing apparatus that is under the management of the host computer 41 and to which e-mail with firmware and script attached is transmitted.

Here, a DBMS (database management system) is installed in the host computer 21, and an operator is able to access the transmission-destination database via the DBMS. Note, however, that the operator may accesses the database by a means other than a DBMS. In the present embodiment, the DBMS is an RDBMS (relational DBMS), but it is possible to use another type of DBMS.

(5) Contents of Processing by the Host Computer 21

Figure 5:
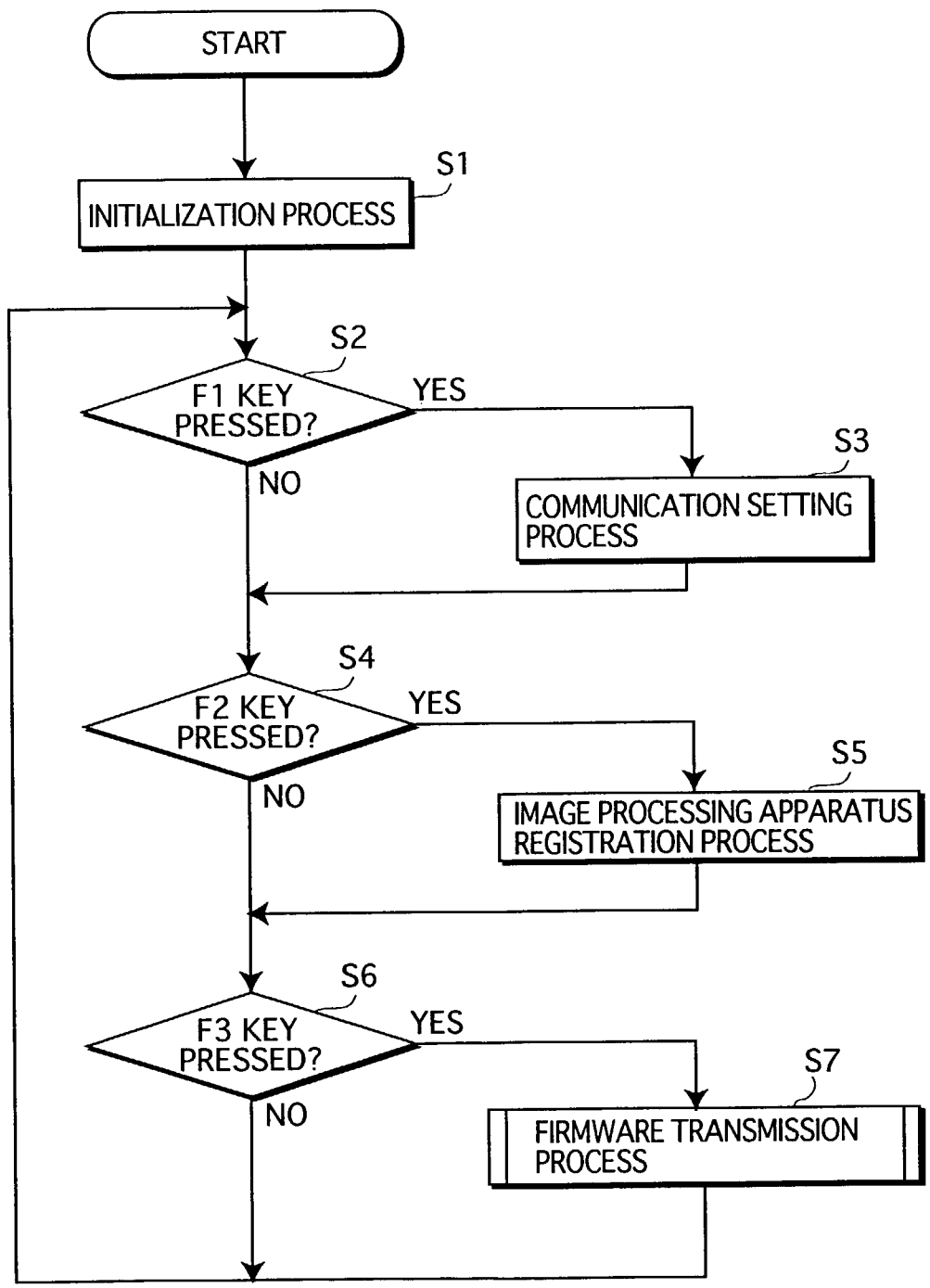
FIG. 5 is a flowchart showing contents of processing by the host computer 21.

The following describes specific contents of processing by the management system 10 having the above-described structure. First, the contents of processing by the host computer 21 provided at the service center 20 that relate to e-mail transmission processing for updating firmware are described. FIG. 5 is a flowchart showing the processing by the host computer 21.

On having its power turned on, the host computer 21 begins processing, first performing an initialization process (S1). The initialization process includes initializing hardware such as the RAM 2146 according to a boot program read from the ROM 2145, activating the OS (operating system) and necessary application programs, and displaying an initial screen on the display 211.

After the initialization process has finished, the host computer 21 waits for an input. In this state, the host computer 21 receives input relating to updating firmware. Specifically, input of "communication setting process", "image processing apparatus registration process" or "firmware transmission process" instructions are received according to function keys F1 to F3 that are provided on the keyboard 212.

On detecting that the F1 key has been pressed (S2: Yes), the host computer 21 performs a communication setting process (S3). Specifically, the host computer 21 receives input for setting parameters that are necessary for transmitting e-mail, and stores the set parameters in the storage device 2147. Examples of these parameters are the IP address of the mail server 23 connected to the LAN 22 at the service center 20, and the e-mail address of the host computer 21.

When the F1 key has not been pressed (S2: No), on detecting that the F2 key has been pressed (S4: Yes), the host computer 21 performs the image processing apparatus registration process (S5). Specifically, the host computer 21 receives inputs of information, which it stores in the transmission-destination database in the storage device 2147. Such information includes the e-mail address of an image processing apparatus to which firmware is to be transmitted, identifiers of the control modules in the image processing apparatus (hereinafter "control module ID(s)"), the file name of the firmware, script and the like to be transmitted, and the user name, address, telephone number and the like of the user of the image processing apparatus.

As has been described, the database that the host computer 21 stores in the storage device 2147 is a relational database, and therefore the information is stored in a table format. FIG. 6 shows an example of the contents of the transmission-destination database. As FIG. 6 shows, each image processing apparatus that is managed by the management system 10 is given a unique identifier (hereinafter "apparatus ID"). When an image processing apparatus has a plurality of control modules, each control module is also given a control module ID. The apparatus IDs and control module IDs are used as keys in managing data for each image processing apparatus and each control module. The items of data in the database include "e-mail address", "compressed file name", "firmware name", "pre-update script file name", "post-update script file name", and "other information" for transmission destinations.

The "control module ID" is an identifier that, when one image processing apparatus has a plurality of control modules like the image processing apparatus 42, identifies which control module is controlled by firmware included in a file designated by a file name. The "compressed file name" is a file name that is stored after compressing firmware and script into one file when transmitting firmware. In the present embodiment, firmware and script to be attached to e-mail are compressed together with use of compression software to create one file, and the compressed file is converted to text.

Here, firmware is ordinarily created as binary data. The original firmware is stored in a file that has the same file name as the compressed file, but a different extension. An example of a file that stores the original firmware is "Firmwrl.dat" in FIG. 6. Script is ordinarily stored as text data in files whose names are designated by "pre-update script file name" and "post-update script file name". The file designated by "pre-update script file name" is script listing a process to be executed before updating firmware (hereinafter "pre-update process"), while the file designated by "post-update script file name" is script listing a process to be executed after updating firmware (hereinafter "post-update process").

Note that there are various types of compression software that may be used to compress files, and the extension of a compressed file is not limited to being "lzh". As long as the file can be decompressed by the image processing apparatus that receives the e-mail, the extension may be "lha", "Zip", "gz", "sit", "cpt" or any other arbitrary extension that corresponds to the compression method used.

The following describes a specific example of the apparatus ID "1" and the control module ID "1" in the example in FIG. 6. In this example, three files are compressed together to generate a compressed file (file name "Firmwrl.lzh"). Specifically, the three files are a file (file name "Firmwrl.dat") that stores firmware as binary data, a file (file name "Bscript1.txt") that stores script listing a pre-update process, and a file (file name "Ascript1.txt") that stores script listing a post-update process. Since the generated compressed file is binary data, it is attached to e-mail after being converted to text using a method such as Base64.

Note that processing shown by script may be executed both before and after firmware updating, such as in the above-describe example, or may be executed only before or only after updating.

The "other information" is text data, and includes information such as the user name, address and telephone number of the user of the image processing apparatus. This information may, of course, be stored as separate items such as "user name" and "address".

Returning to the flowchart in FIG. 5, when the F2 key has not been pressed (S4: No), on detecting that the F3 key has been pressed (S6: Yes), the host computer 21 performs a firmware transmission process (S7). Specifically, the host computer 21 transmits firmware and script to the image processing apparatus with use of e-mail, in the above-described manner, to have firmware updated.

Figure 7:
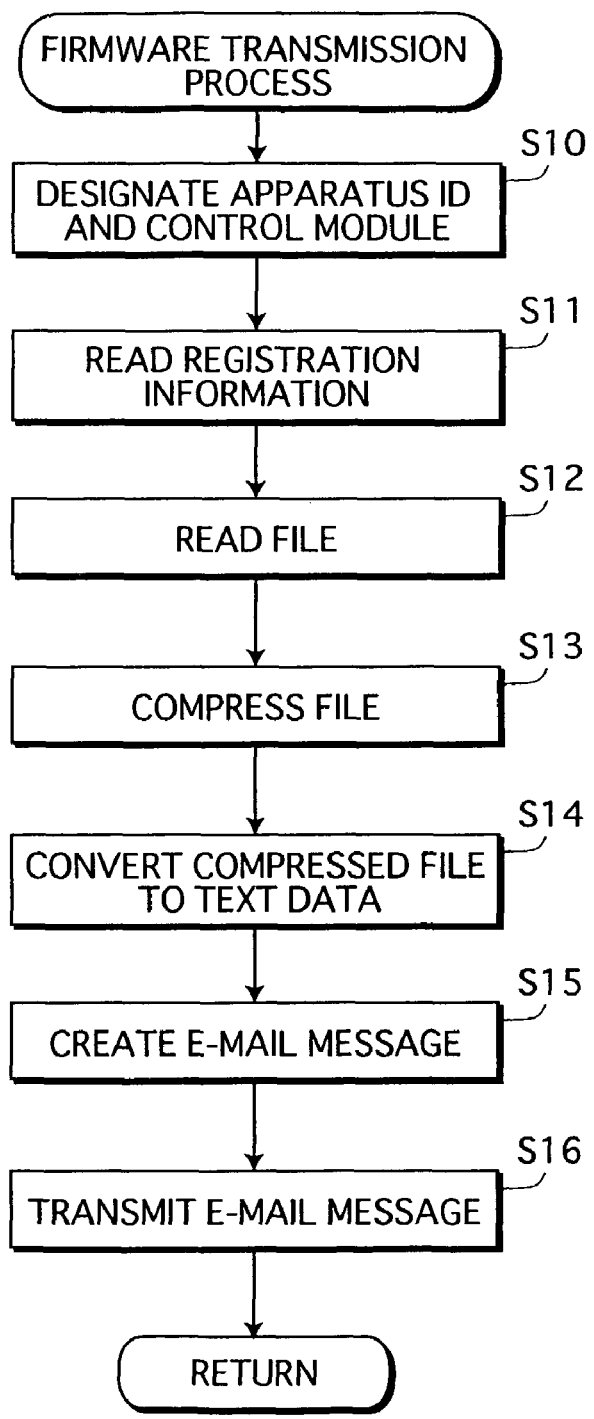
FIG. 7 is a flowchart showing details of contents of a firmware transmission process.

The following describes the contents of the firmware transmission process (S7). FIG. 7 is a flowchart showing the contents of the firmware transmission process in detail. In the firmware transmission process, the host computer 21 first receives designation of the apparatus ID and the control module ID of the image processing apparatus to which firmware is to be transmitted (hereinafter "transmission destination") (S10). More specifically, the host computer 21 receives input via the keyboard 212 or the like of, for example, the apparatus ID and the control module ID, as information specifying the transmission destination. The host computer 21 uses the input data as a key to read the transmission-destination database, and then reads the record that includes registration information corresponding to the input data from the transmission-destination database (S11).

Next, the host computer 21 reads firmware and script from the storage device 2147 according to the contents of the registration information (S12). The host computer 21 then compresses the read files together with use of compression software, and generates a single compressed file (S13). The file name is determined according to the contents of the registration information.

Since the compressed file is created as binary data, the host computer 21 converts the binary data to text data using a conversion method such as Base64 (S14). In addition, the host computer 21 reads the e-mail address from the record in the obtained registration information, and creates an e-mail message addressed to the read e-mail address (S15). The contents of the compressed file, in other words the new firmware and the script, are attached to the e-mail message.

The host computer 21 transmits the e-mail message to which the contents of the compressed file have been attached to the mail server 23 (S16). In other words, the host computer 21 refers to the IP address and so on of the mail server 23 that are set at step S3 in FIG. 5, establishes a TCP connection with the mail server 23, and sends the e-mail message to the mail server 23 in conformity to SMTP.

Returning to the flowchart in FIG. 5, when the F3 key has not been pressed at step S6 (S6: No), or when the firmware transmission process has ended, the host computer 21 returns to step S2, and repeatedly checks whether the function keys F1 to F3 have been pressed.

(6) E-mail Message to Which the Contents of the Compressed File Have Been Attached The following describes an e-mail message to which the contents of a compressed file, in other words the contents of firmware and script, have been attached. In the present embodiment, the format of the e-mail message conforms to RFC822. FIG. 8 shows the contents of an e-mail message to which firmware and so on have been attached.

As shown in FIG. 8, the e-mail message is formed from a header and a body, in conformity to RFC822 specifications. The header and the body are separated by a NULL line. Note that "NULL line" refers to a line that includes only CRLF (carriage return line feed).

The header is composed of predetermined header fields. Specifically, these fields are, in addition to "From", "To", "Date" and "Subject" specified by RFC822, three fields "MIME-Version", "Content-Type" and "Content-Description" specified by RFC1521. Each field is composed of a name and a body that are separated by a colon (:).

In the example in FIG. 8, "multipart/mixed" in the body of the "Content-Type" field shows that the body of the message is divided into a plurality of parts. Here, "multipart/mixed" is followed by a semicolon (;), which is followed by "boundary" and a predetermined character string ("5kvrZF/hrA" in the example in FIG. 8). Here, "boundary" is a parameter showing the boundary of a part. Furthermore, "Firmware" is displayed in the body of the "Content-Description" field. This shows that firmware is included in the e-mail message.

The following describes the body of the e-mail message. The boundary parameter ("5kvrZF/hrA" in the example in FIG. 8) shown in the "Content-Type" field in the header is displayed in the body with a character string (--) inserted before ("--5kvrZF/hrA" in the example in FIG. 8). This shows the start of a part.

The lines after the line showing the boundary parameter have two header fields: "Content-Type" and "Content-Transfer-Encoding", which are for displaying attributes of data stored in the part. Here, "application" is displayed in the body of the "Content-Type" field. This shows that the data stored in the part is binary data that is not typically interpreted, or is information that is processed by an application.

A slash (/) that follows "application" is followed by a sub-field name "octet-stream" that shows that the data is binary data that is not interpreted by a mailer. This is followed by a semicolon, and then a file name ("Firmwrl.lzh" in FIG. 8) of the compressed file that is the contents of the attached file.

Note that since RFC822 specifies that e-mail consists of lines of text, binary data of a compressed file or the like that is attached to e-mail must be converted to text data. Therefore, the body of the "Content-Transfer-Encoding" field in the next line shows "base64", which expresses the method by which the binary data has been encoded. This is how it is known that the compressed file has been converted to US-ASCII characters according to Base64.

These two header fields are followed by the compressed file data that has been converted to US-ASCII characters according to Base64. Note that the encoding method is not limited to being Base64, and may be another method such as Uuencode or BinHex.

The boundary parameter ("5kvrZF/hrA" in the example in FIG. 8) displayed in the "Content-Type" field in the header is displayed at the end of the body with a character string "--" before and after ("--5kvrZF/hrA--" in the example in FIG. 8), to show the end.

(7) Contents of Processing by the Management Unit 41

Figure 9:
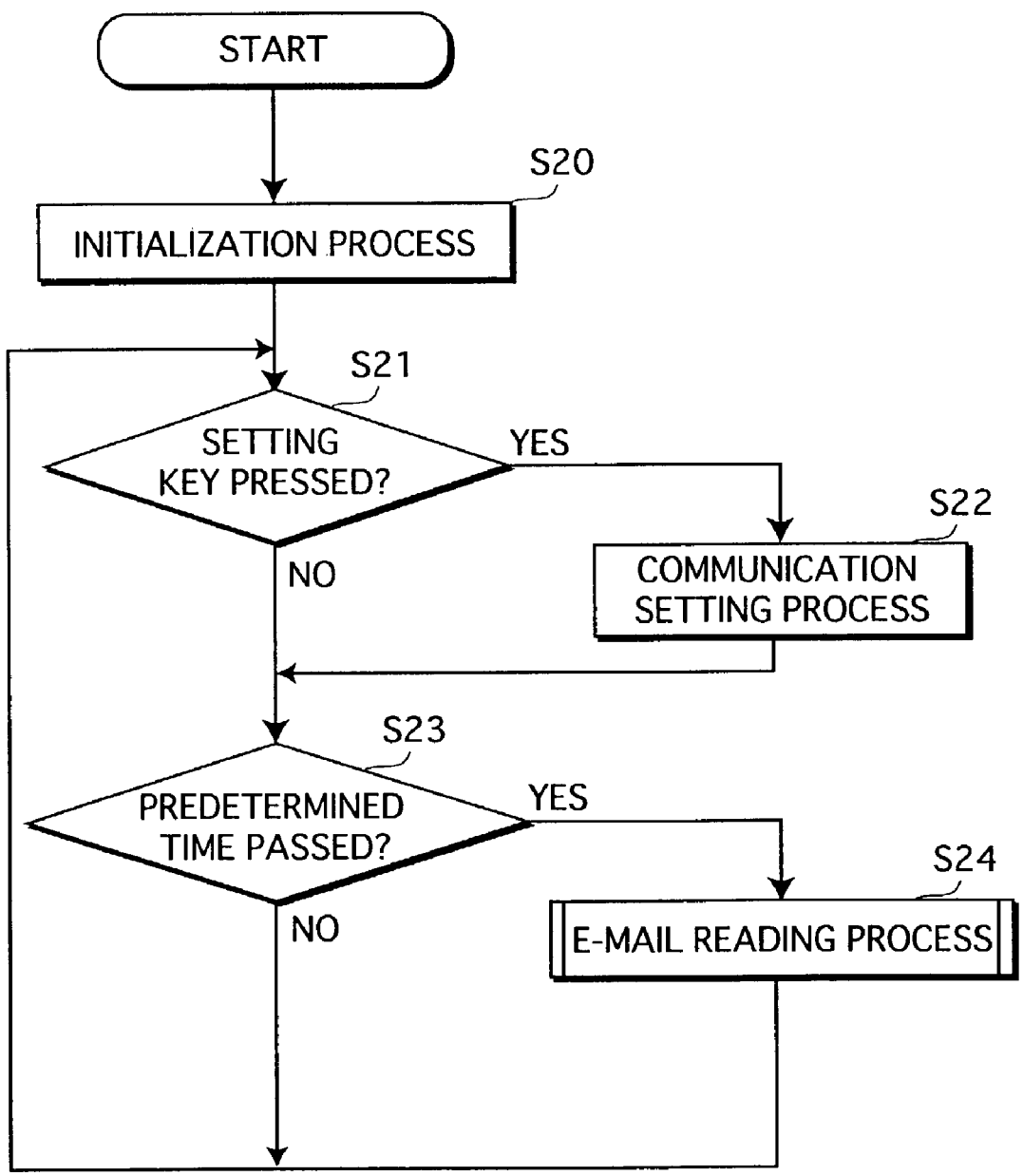
FIG. 9 is a flowchart for describing the contents of processing when the management unit 41 receives an e-mail message.

The following describes the contents of processing by the management unit 41 provided at the user site 40. FIG. 9 is a flowchart showing the contents of processing by the management unit 41 for receiving e-mail. On having its power turned on, the management unit 41 begins processing, and executes an initialization process that includes initializing the memory and parameters (S20).

The management unit 41 detects whether a setting key provided on the operation panel 420 has been pressed. When the setting key has been pressed (S21: Yes), the management unit 41 performs a communication setting process (S22). Specifically, the management unit 41 receives settings of parameters that are necessary for receiving and transmitting an e-mail message, via the operation panel 420. In other words, the management unit 41 receives, via the operation panel 420, input of settings of the IP address, e-mail account name and password of the mail server 46, and a time interval for checking whether there are any newly-arrived e-mail messages at the mail server 46. The pieces of input information are stored at respective predetermined addresses in the NVRAM 415.

When the setting key is not pressed (S21: No), or when the communication setting process has finished, the management unit 41 refers to the timer 414, and judges whether a predetermined time internal has passed since last accessing the mail server 46 (S23). The predetermined interval is a value stored in the NVRAM 415 in the communication setting process, and is the time interval at which the management unit 41 checks whether there are any newly-arrived e-mail messages at the mail server 46. When the predetermined interval has passed (S23: Yes), the management unit 41 performs an e-mail reading process (S24).

Figure 10:
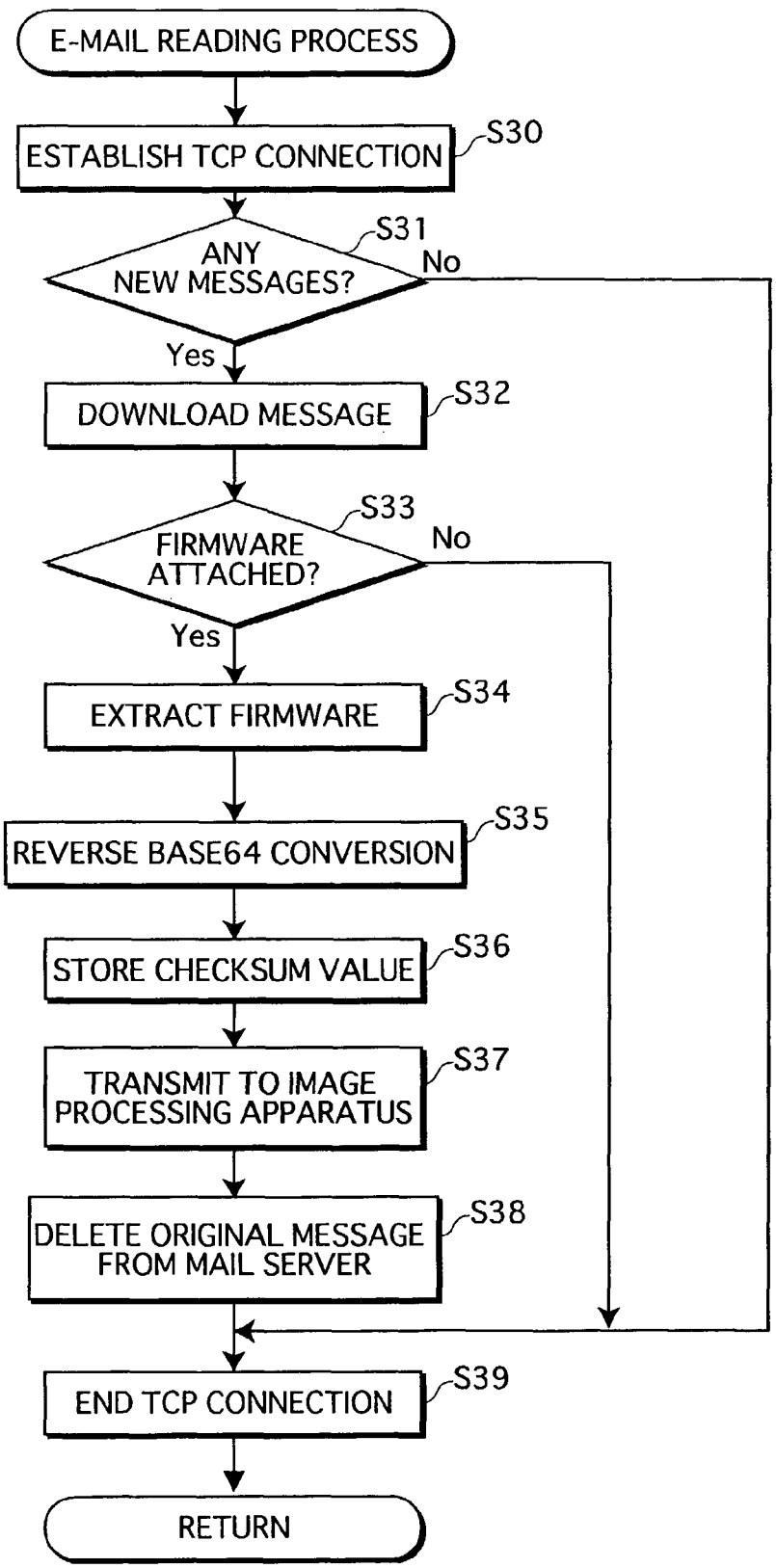
FIG. 10 is a flowchart showing details of contents of an e-mail reading process.

FIG. 10 is a flowchart showing the details of the e-mail reading process. In the e-mail reading process, the management unit 41 first establishes a TCP connection with the mail server 46 (S30) After the TCP connection is established, the management unit 41 inquires to the mail server 46 whether there are any newly-arrived e-mail messages, in conformity with POP3. When there is a newly arrived message (S31: Yes), the management unit 41 makes a request to the mail server 46 to send the message (S32).

On receiving the newly-arrived message, the management unit 41 checks the present time, which it stores at a predetermined address in the NVRAM 4214. Next, the management unit 41 refers to the "Content-Description" field in the header of the received message, to check whether "Firmware" is listed in the body of the field.

When "Firmware" is listed in the body of the field, the management unit 41 judges that the contents of a compressed file that includes firmware are attached to the message (S33: Yes), and extracts the part of the text that corresponds to the compressed file (S34). Note that the management unit 41 is not limited to judging whether firmware and script are attached by whether "Firmware" is listed in the body of the "Content-Description" field. Possible alternative methods are for the management unit 41 to judge by referring to the content of the "Subject" field or the name of the attached file. Furthermore, it is possible to combine the above-described judgement methods (for example, referring to both the content of the "Content-Description" field and the file name) to avoid judgement errors.

The management unit 41 decodes the extracted US-ASCII data based on Base64 (reverse Base64 conversion), to obtain the original compressed file (filename "Firmware.lzh" in the example in FIG. 8) (S35). By decompressing the compressed file, the management unit 41 obtains the script and the firmware. Either one or two files are obtained from the script, depending on whether the script shows a pre-updating process, a post-update process, or both. The script is usually text data, and can be executed as is with use of an interpreter or the like that is included in the existing firmware.

The management unit 41 calculates the checksum of the binary data, and stores the checksum in a predetermined address in the NVRAM 415 (S36). Note that there are cases in which the compressed file is to large to be attached to one e-mail message as a single file, and is therefore divided and transmitted attached to a plurality of e-mail messages. Processing in such cases is described later. Next, the management unit 41 attaches the control module ID shown in the body of the "Subject" field to the obtained binary data, and transmits the resulting data to the image processing apparatus 42 via the serial I/F 411 (S37).

After downloading the firmware, etc. as described, the management unit 41 deletes the original e-mail message from the mail server 46 in conformity with POP3 (S38). The management unit 41 then ends the TCP connection with the mail server 46 (S39), and ends the process. When there is no newly-arrived message (S31: No), or when the newly-arrived message does not have firmware attached thereto (S33: No), the management unit 41 proceeds directly to step S39, ends the TCP connection with the mail server 46, and ends the e-mail reading process. After ending the e-mail reading process, the management unit 41 returns to the process in the flowchart in FIG. 9, and again detects whether the setting key is pressed (S21).

Note that the process for deleting the original e-mail message from the mail server 46 may be performed alternatively after processing according to the attached file (i.e., the processing described by the script, updating of firmware, etc.) is complete. This so that the e-mail message can be downloaded again if the firmware updating fails. Specifically, failure can occur not only in cases that can be judged by a checksum (for example, data being garbled), but also cases such as the image processing apparatus being turned off during the updating process. In the latter case, the e-mail message can be obtained again when the image processing apparatus is turned back on.

Furthermore, it is not necessary for each e-mail to be deleted when it is downloaded. Instead, a delete process may be performed, for example, at a predetermined time interval, or on the power of the image processing apparatus being turned on.

(8) Content of Processing by the Image Processing Apparatus 42

Figure 11:
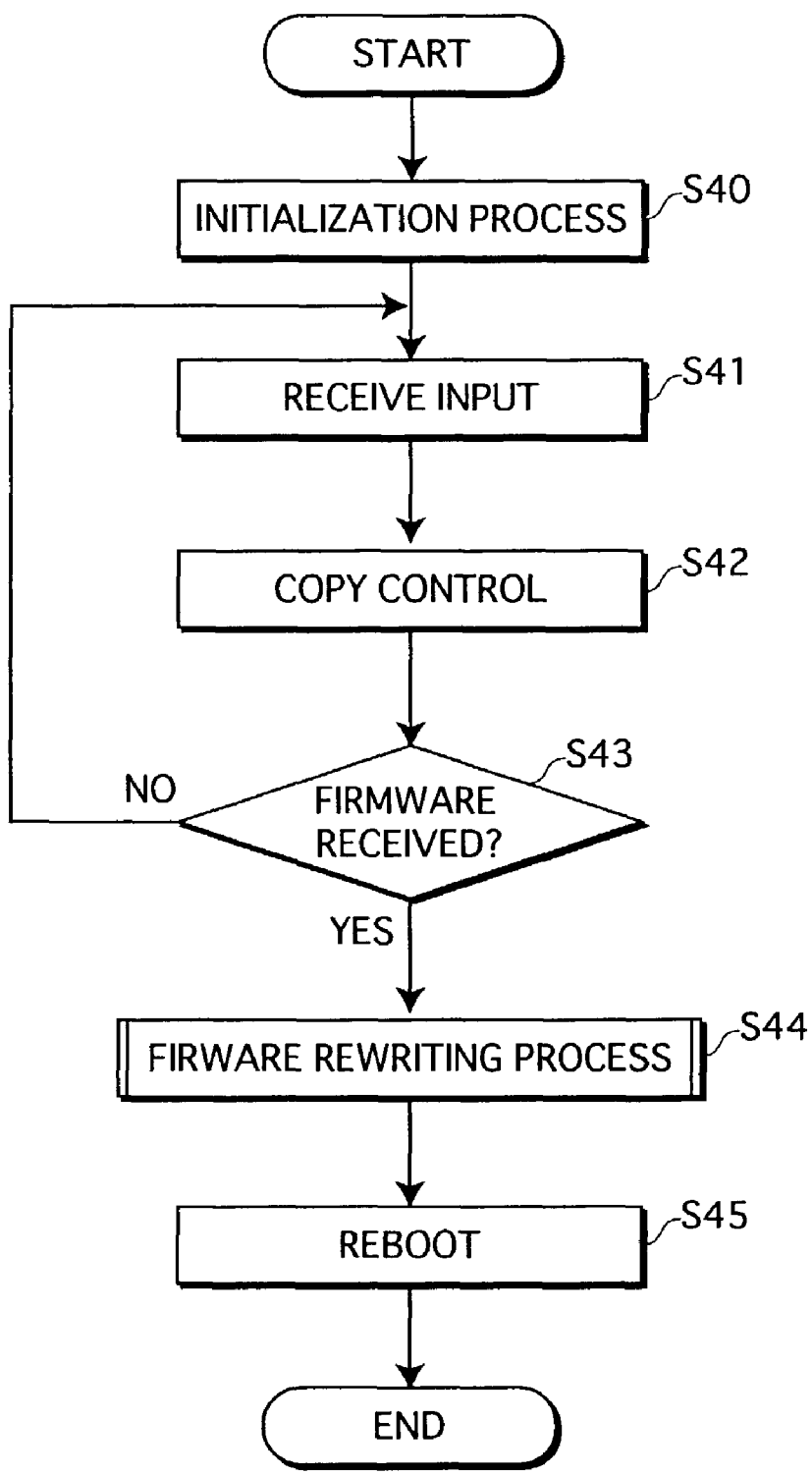
FIG. 11 is a flowchart showing contents of processing executed in the image processing apparatus 42.

The following describes specific contents of the firmware rewriting process performed by the image processing apparatus 42. FIG. 11 is a flowchart showing the contents of processing executed by the image processing apparatus 42. The image processing apparatus 42 begins processing on having its power turned on, and performs an initialization process for initializing the contents of the memories and setting standard mode (S40). Note that the initialization process is executed individually for each control module 421 to 424.

When the initialization process is complete, the image processing apparatus 42 repeats ordinary processing until receiving firmware from the management unit 41. Specifically, when performing ordinary processing, the image processing apparatus 42 receives inputs of signals from the operation panel 4218 and sensors in the image processing apparatus 42, or receives input of print jobs from the management unit 41.

On receiving input, the image processing apparatus executes copy control (S42). Here, copy control is a general name for processing necessary for image forming operations. Copy control refers to processing for controlling the various components of the image processing apparatus 42, such as paper feed control, operation control, photosensitive drum control, developer control, and processing for print jobs received from the management unit 41. The control units 421 to 424 perform copy control in coordination with each other.

After ordinary processing (S41, S42) has ended, the image processing apparatus 42 receives firmware etc. from the management unit 41, and judges whether it has received a firmware rewrite instruction (S43). When the image processing apparatus 42 has not received a firmware rewrite instruction (S43: No), it returns to step S41 to continue ordinary processing.

When the image processing apparatus 42 judges that it has received a firmware rewriting instruction (S43: Yes), it executes a firmware rewriting process (S44). The following describes details of the firmware rewriting process.

Figure 12:
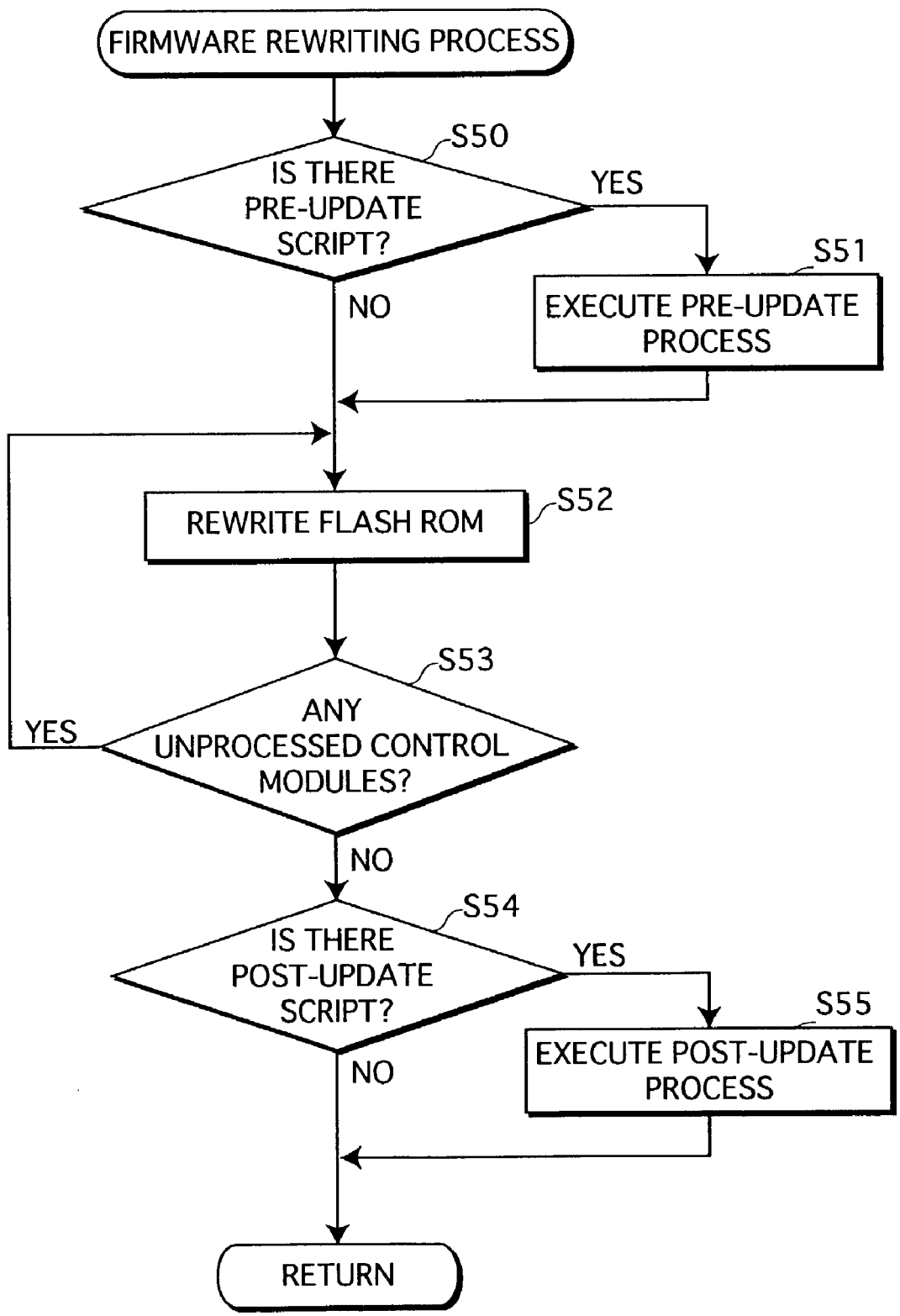
FIG. 12 is a flowchart showing details of contents of a firmware rewrite process.

FIG. 12 is a flowchart showing details of the firmware rewriting process. The image processing apparatus 42 first judges whether it has received pre-update script from the management unit 41 (S50).

When it has received pre-update script (S50: Yes), the image processing apparatus 42 executes the described pre-update process (S51). Possible examples of a pre-update process include processing to temporarily save changed contents of setting values to a predetermined area in the SRAM 4123, and error processing to restore the image processing apparatus 42 from an error state (for example, a document size detection error) The pre-update process is not limited to these examples, but is flexible, so long as it is a process that is able to be performed in the image processing apparatus 42. Note that although in the present embodiment script is transmitted as text, and the process described by the script is executed with use of an the interpreter language included in the original firmware, it is possible for the transmitted control program to be binary code.

Next, the image processing apparatus 42 refers to the ID of the control module to be rewritten that is designated by the firmware rewrite instruction from the management unit 41, and rewrites the flash ROM that corresponds to the ID, with new the firmware (S52). Specifically, when the ID shows control module 421, the image processing apparatus 42 stores the firmware received from the management apparatus 41 at a predetermined address in the flash ROM 4212 of the control module 421. Likewise for other modules, new firmware corresponding to the ID is transmitted serially to the corresponding control module, and the control module performs a flash ROM rewriting process.

Since there are cases in which the firmware in the compressed file corresponds to a plurality of control modules, the image processing apparatus 42, regardless of whether new firmware has been transmitted or not, judges whether there is an unprocessed control module (S53). When there is an unprocessed control module (S53: Yes), the image processing apparatus 42 rewrites the flash ROM of the control module (S52) in order to update the firmware.

When all control modules have been updated (S53: No), the image processing apparatus 42 judges whether it has received post-update script (S54). When there is post-update script (S54: Yes), the image processing apparatus executes the post-update process (S55), and ends the firmware rewrite process. The post-update processing may be, but is not limited to being, a process for converting content (customized content and the like) stored in the pre-update process to be compatible with the new firmware, or a process for storing temporarily saved content to an appropriate address area.

After performing the firmware rewriting process, the image processing apparatus 42 returns to the processing shown by the flowchart in FIG. 11, and reboots in order to operate according to the new firmware (S45). When rebooting, the image processing apparatus 42 sets "True" in a predetermined address section of the NVRAM 4214. This is so that after rebooting the image processing apparatus 42 is able to judge whether the reason for rebooting is firmware rewriting or not.

(9) Transmitting a Compressed File Divided

The following describes how compressed file that includes firmware and script is transmitted when the compressed file is divided into a plurality of files and each file is transmitted separately. The reason that it is necessary to be able to send a compressed file divided is that there are often limits on the size of a file that can be attached to a single e-mail. This is to prevent the e-mail from exceeding the capacity of the mail server, and to lighten the load on the network. It is possible that a large firmware may exceed the limit, even if it is compressed.

One method of transmitting a compressed file divided is, when the compressed file includes firmware that corresponds to a plurality of control modules, is to divide the compressed file so that firmware for each module is transmitted separately. Here, the script is transmitted with one of the firmwares for one of the modules. Another method is, when a single compressed file includes a plurality of firmwares, to divide the compressed file into pieces of data of a predetermined size. The following briefly describes specific contents of processing when transmitting firmware for each control module separately.

When there is a predetermined order in which firmware is to be rewritten (for example, when control modules 421, 422, 423 and 424 are to be rewritten in the stated order), the management unit 41 stores the rewriting order in the NVRAM 415 in advance.

Figure 13:
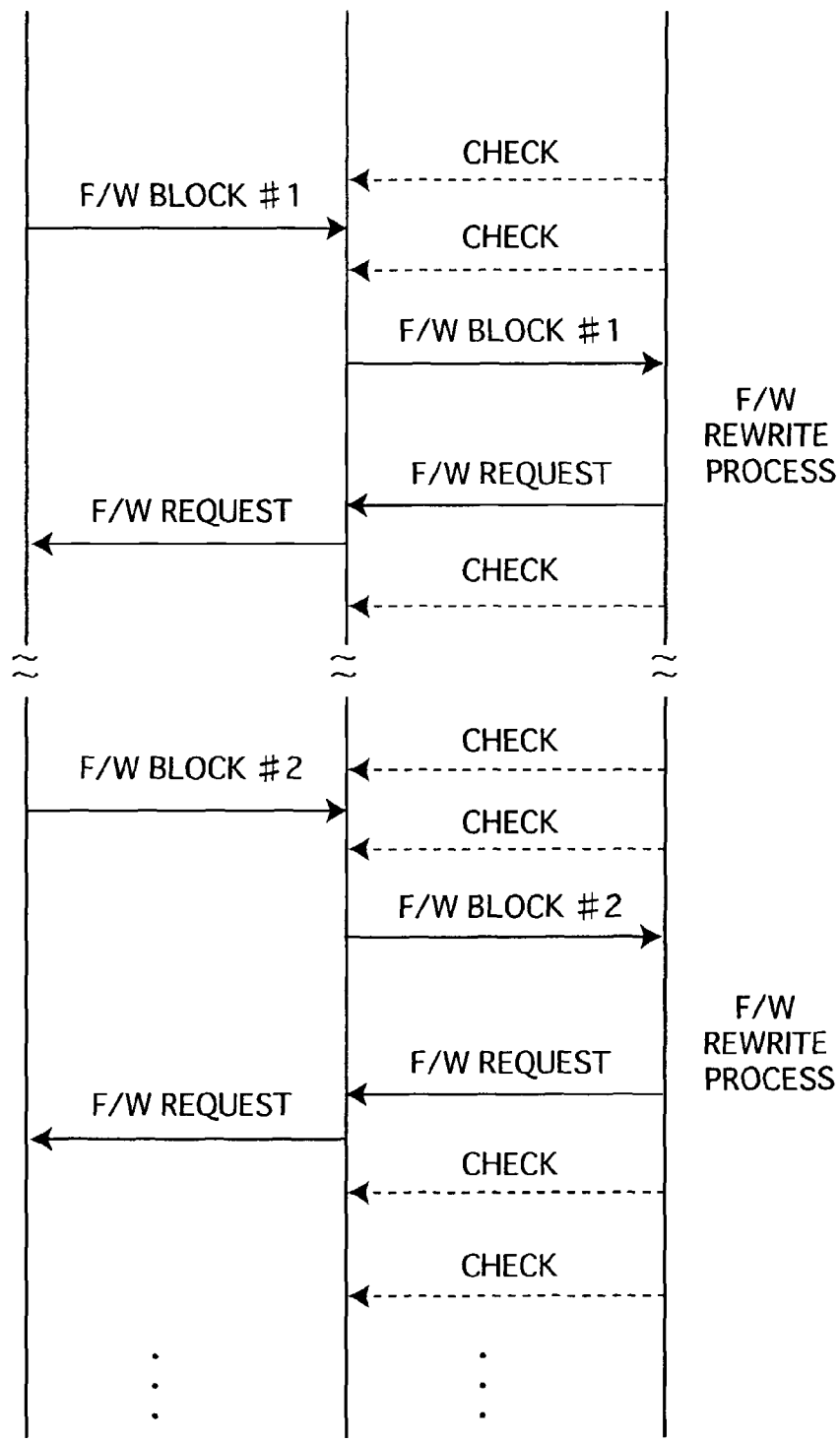
FIG. 13 is a sequence diagram showing a communication procedure executed between a service enter 20, a mail server 46 and the management unit 41, when firmware is transmitted divided.

FIG. 13 shows the sequence of communication procedures between the service center 20, the mail server 46 and the management unit 41 when transmitting firmware divided. In this example, the management unit 41 checks periodically for whether mail has arrived at the mail server 46, as shown by the broken lines in FIG. 13.

When firmware for the control module 421 has arrived at the mail server 46, the management unit 41 downloads the firmware. Next, the image processing apparatus 42 executes a firmware rewriting process for the control module 421. When pre-update script or post-update script is attached to the downloaded e-mail, it is possible to perform processing based on the script. When the firmware rewriting process has been executed, the image processing apparatus 42 reads the contents of the flash ROM 4212, calculates the checksum, and transmits the checksum to the management unit 41.

The management unit 41 compares the checksum value received from the control module 421 with a checksum received from the service center 20 together with the firmware, and if the two are identical, transmits an e-mail message to the host computer 21 at the service center 20 requesting the next firmware.

Figure 14:
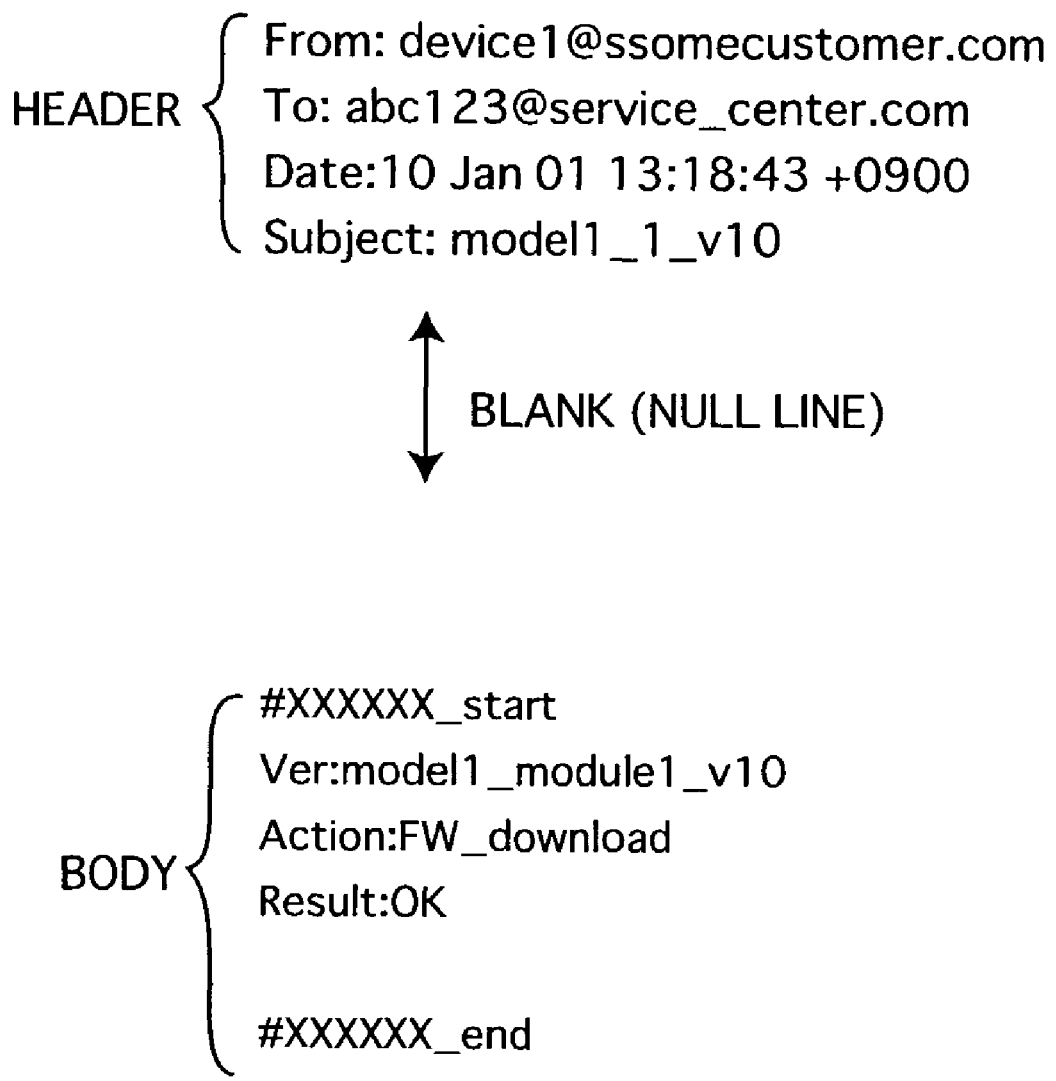
FIG. 14 shows one example of the contents of an e-mail message transmitted by the management unit 41 to the service center 20.

FIG. 14 shows an example of the contents of the e-mail message that the management unit 41 transmits to the service center 20. The body of the e-mail message shows the apparatus ID of the image processing apparatus whose firmware has been rewritten, the control module ID, and version information. In the example in FIG. 14, the body of the e-mail message includes "model1_module1_v10". In other words the body includes a model ID "1", a control module ID "1", and a version number "10".

The following two lines show the contents of the request to the service center 20, and the result of the firmware rewriting. In the example in FIG. 14, the request is "FW_download", in other words, a firmware transmission request, and the result is "OK", in other words, the firmware rewriting was successful. When the firmware rewriting fails, the result is "NG". These items of data are separated from other parts of the e-mail message by predetermined character strings ("#XXXXXX_start" etc. in FIG. 14).

Note that when the two checksum values are not identical, an e-mail message is transmitted to the service center 20 showing that the result of rewriting is failure. Consequently, an e-mail message is transmitted from the management unit 41 to the service center 20 whether the checksum values are identical or not.

The e-mail message is transmitted to the service center 20 via the mail server 46. If the result shown in the e-mail message received by the service center 20 shows that rewriting was successful, the service center 20 transmits an e-mail message to which firmware for the control module 422 and any necessary predetermined script are attached, to the management unit 41.

Furthermore, if the result shows that rewriting has failed (not illustrated), the service center 20 re-transmits an e-mail message to which the firmware for the control module 421 and an necessary script are attached are attached, to the management unit 41.

During this time the management unit 41 periodically accesses the mail server 46 and checks for e-mail messages. On confirming that the e-mail message to which firmware for the control module 422 is attached has arrived, the management unit 41 downloads the e-mail message, and executes a firmware rewriting process.

Firmware for the control modules 421 to 424 is sent in order from the service center 20 to the management unit 41 according to the above-described procedure. Such a procedure means that less area is required in the storage device in the management unit 41, compared to when the firmware for all the control modules 421 to 424 is transmitted together.

Note that generally mail servers that relay e-mail messages have a limit on the total size of e-mail messages at the mail server for each mail account, and the mail server 46 also has a limit for the size of data of e-mail messages that it stores for the image processing apparatus 42.

If firmware is transmitted divided, only firmware corresponding to one control module is accumulated in the mail server 46 at once. This avoids situations in which the mail server 46 refuses to store e-mail messages because of the limits.

Although the above-descried example is an example of transmitting firmware for each control module separately, the firmware is not limited being divided by control module. It is possible, for example, to divide the firmware into pieces of data of a predetermined size. The following describes such an example.

Firmware that has been divided into pieces of data of a predetermined size is reconstructed by the management unit 41 to obtain the original firmware. For this purpose, information such as the following is attached to the e-mail message.

FIG. 15 shows one example of the main part of an e-mail message to which a piece of divided firmware of the predetermined size is attached. As FIG. 15 shows, a character string "(1/4)" is attached to the end of the body of the "Subject" field in the header.

Here, "(1/4)" shows that the original firmware is divided into four pieces, and that the data attached to the e-mail message is the first of the four pieces. After transmitting this e-mail message, the service center 20 transmits e-mail messages to which the second to fourth pieces of the firmware are respectively attached.

Character strings "(2/4)", "(3/4)" and "(4/4)" are attached to the end of the "Subject" field in the header of the respective e-mail messages in the manner described above. The management unit 41 begins a Base64 reverse conversion process, a compressed file decompression process, and a firmware rewriting process (including pre- and post-update processes as described by script) after confirming reception of all sections of the divided firmware. Note that in the present embodiment, since firmware and script are compressed together and then converted by Base64 to text data, it is preferable to convert the text data back to binary data after acquiring all the pieces of text data.

As has been described, dividing firmware to conform to the data size limit of the mail server enables firmware rewriting to be performed smoothly without the mail server that relays e-mail messages refusing the receive the e-mail messages. Note that although compressed files obtained by dividing one compressed file are corresponded by the model ID and the control module ID in the body of the "Subject" field and by attached information such as "(1/4)" in the above-described example, the compressed files are not limited to being corresponded in this manner.

Furthermore, it is, of course, possible to transmit each of a plurality of pieces of firmware that correspond to a plurality of control modules compressed with corresponding script. In such a case, the management unit or the image processing apparatus decompresses the files, identifies the file names, and performs processes such as a pre-update process, a flash ROM rewriting process and a post-update process separately for each control module.

Although the firmware and script are described as different programs in the present embodiment, it is not necessary that they be separate programs. The pre-update process and/or the post-update process may be executed by a program included in the firmware.

Note that a program included in a program product of the present invention may be recorded on a computer-readable recording medium, and manufactured, transferred from party to party, and so on in a state of being recorded on the recording medium. Examples of the recording medium include a semiconductor memory, magnetic recording media such as magnetic tape and flexible disks, optical recording media such as DVD (Digital Versatile Disk),CD-ROM (Compact Disk Read Only Memory), CD-R (Compact Disk Read), MO (Magneto Optical), and flash memory recording media such as Smart Media™ and COMPACTFLASH™. Furthermore, the program product may be transferred via wired or wireless networks, including the Internet, broadcasting, electric communication lines, satellite communication, and so on.

Furthermore, it is not necessary for the program product of the present invention to include all the modules for having an image processing apparatus execute the described processing. The program product may, for example, have the image processing apparatus execute the processing of the present invention by using a general program, such as an operating system (OS), that is installed in the image processing apparatus separately. Furthermore, the program product may have the predetermined processing executed by using special-purpose hardware.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus being connectable to an external device through a network, comprising:
   a receiver which receives data for executing firmware updating sent from the external device; and
   a processor which judges whether a pre-update script or program for a control action other than a firmware updating is attached to the data received from said external device so that updating of the firmware stored in the image processing apparatus is executed using said received data from said external device without the control action being executed when it is judged that the pre-update script or program is not attached to the data received from said external device, and the control action is executed before the firmware updating in addition to the execution of the firmware updating using said received data from said external device when it is judged that the pre-update script or program is attached to the data received from said external device,
   wherein the control action includes an action by which customized parameter setting of the firmware that have been customized by the user and that were being performed with respect to the firmware before updating remain compatible with the firmware after updating, and
   the processor judges whether a post-update script is attached to the data received from said external device, the post-update script converting a temporarily saved customized parameter to be compatible with the firmware after updating or storing the temporarily saved customized parameter to an appropriate address area.

2. The image processing apparatus of claim 1, wherein the pre-update script or program for a control action includes an action for saving a set value to another storage area before updating the firmware, the set value having been modified and stored in the image processing apparatus.

3. The image processing apparatus of claim 2, wherein after updating the firmware, the processor judges whether the control action includes an action for changing a set value to adapt to an updated firmware after updating the firmware, the set value having been modified and stored in the image processing apparatus.

4. The image processing apparatus of claim 2, wherein the control action further includes an action for restoring the saved set value to an appropriate storage area after the updating of the firmware.

5. The image processing apparatus of claim 1, wherein the received data includes a new firmware to be used for updating, and a program that has the processor unit execute the control action.

6. The image processing apparatus of claim 1, wherein the control action includes an action executed using an interpreter language installed on the image processing apparatus, and text data that describes the control action and that is included in the received data.

7. The image processing apparatus of claim 1, wherein the control action includes an action executed in the processor unit based on binary data included in the received data.

8. The image processing apparatus of claim 1, wherein the image processing apparatus includes a plurality of control modules, each control module storing firmware that corresponds to the control module, and
   the firmware of each module is respectively updated based on the received data.

9. The image processing apparatus of claim 1, wherein a control action is executed after updating the firmware.

10. The image processing system of claim 1, wherein;
the firmware is updated based on a first portion of the received data and the control action is executed before updating the firmware based on a second portion of the received data, the first portion being different than the second portion.

11. A non-transitory computer program product including a computer program for having an external device that executes the computer program send data to an image processing apparatus which is connected to an external device via a network, the computer program product being embodied in a computer-readable recording medium and comprising computer program instructions for:
generating data by which a firmware stored in the image processing apparatus is updated; and
attaching to the generated data a corresponding pre-update script or program by which a control action other than a firmware updating is executed before updating the firmware, when said pre-update script or program is designated to be attached to the generated data, while said pre-update script or program is not attached when said pre-update script or program is not designated to be attached to the generated data;
sending, when said pre-update script or program is attached, the generated data together with the pre-update script or program attached thereto from said external device to the image processing apparatus via the network such that the updating and the control action are executed in the image processing apparatus; and
sending, when said pre-update script or program is not attached, the generated data from said external device to the image processing apparatus via the network, such that updating is executed in the image processing apparatus, without the control action being executed;
wherein the control action includes an action by which customized parameter setting of the firmware that have been customized by the user and that were being performed with respect to the firmware before updating remain compatible with the firmware after updating, and
judging whether a post-update script is attached to the data received from said external device, the post-update script converting a temporarily saved customized parameter to be compatible with the firmware after updating or storing the temporarily saved customized parameter to an appropriate address area.

12. The computer program product of claim 11,
wherein the generated data is composed of a single program, the program having firmware updating and a control action executed in the image processing apparatus.

13. The computer program product of claim 11,
wherein the generated data includes a new firmware to be used for the updating, and a program that has the control action executed.

14. The computer program product of claim 11, wherein the instruction for sending the generated data includes an instruction for sending the e-mail to the image processing apparatus.

15. The computer program product of claim 14,
wherein the instruction for attaching the generated data includes an instruction for attaching the firmware and a program for a control action being executed to the e-mail separately.

16. The computer program product of claim 14,
wherein the instruction for attaching the generated data includes an instruction for compressing the firmware and a program for a control action being executed together, and generating data to be attached, and an instruction for attaching compressed data to the e-mail.

17. The computer program product of claim 16,
wherein the instruction for attaching generated data includes an instruction for dividing compressed data into a plurality of pieces, and an instruction for attaching each piece to different e-mail.

18. The computer program product of claim 17,
wherein the instruction for generating data includes an instruction for generating data for updating each of a plurality of modules in the image processing apparatus, and the instruction for attaching the generated data includes an instruction for dividing the generated data into a plurality of pieces that correspond respectively to the modules.

19. The computer program product of claim 17,
wherein the instruction includes an instruction for dividing the generated data into pieces of a fixed size.

20. The computer program product of claim 11 wherein a control action is executed after updating the firmware.

21. The computer readable medium of claim 11, further comprising;
generating first data based on the information to update the firmware stored in the image processing apparatus, and
generating second data also based on the control action to be executed before updating the firmware, the second data being different than the first data.

22. A management system including at least an image processing apparatus and a management apparatus, both of which are connected to each other through a network, comprising:
a first processor in the management apparatus which generates data by which a firmware stored in the image processing apparatus is updated and attaches to the generated data a script or program by which a control action is executed before or after updating the firmware if said script or program is designated to be attached to the generated data, while said script or program is not attached to the generated data if said script or program is not designated to be attached to the generated data;
a sender in the management apparatus which sends the generated data to the image processing apparatus through the network if said script or program is not attached to the generated data, and sends the generated data and the script or program attached thereto to the image processing apparatus through the network if said script or program is attached to the generated data;
a receiver in the image processing apparatus which receives data from the sender through the network; and
a second processor in the image processing apparatus which judges whether the script or program for a control action is attached to the data received from said management apparatus and whether the script or program for a control action is a pre-update script or program for a control action, other than the firmware updating, so that updating of the firmware stored in the image processing apparatus is executed using said received data from said management apparatus without the pre-update script or program being executed when it is judged that the pre-update script or program is not attached to the data received from said management apparatus, and the control action, other than the firmware updating, is executed before the firmware updating in addition to the execution of the firmware updating using said received data from said management apparatus when it is judged that the pre-update script or program is attached to the data received from said management apparatus;

wherein the control action includes an action by which customized parameter setting of the firmware that have been customized by the user and that were being performed with respect to the firmware before updating remain compatible with the firmware after updating, and
the second processor judges whether a post-update script is attached to the data received from said external device, the post-update script converting a temporarily saved customized parameter to be compatible with the firmware after updating or storing the temporarily saved customized parameter to an appropriate address area.

23. The management system of claim 22, wherein a control action is executed after updating the firmware.

24. The management system of claim 22, wherein;
the first processor in the management system generates first data based on the information to update the firmware stored in the image processing apparatus and generates second data also based on the control action to be executed before updating the firmware.

25. An image processing apparatus being connectable to an external device through a network, comprising:
a receiver which receives data for executing firmware updating sent from the external device; and
a processor which judges whether a pre-update script or program for a control action other than a firmware updating is attached to the data received from said external device so that updating of the firmware stored in the image processing apparatus is executed using said received data from said external device without the control action being executed when it is judged that the pre-update script or program is not attached to the data received from said external device, and the control action is executed before the firmware updating in addition to the execution of the firmware updating using said received data from said external device when it is judged that the pre-update script or program is attached to the data received from said external device,
wherein the control action includes an action by which customized parameter setting of the firmware that have been customized by the user and that were being performed with respect to the firmware before updating remain compatible with the firmware after updating, and
the processor judges whether a post-update script is attached to the data received from said external device, the post-update script storing a temporarily saved customized parameter to an appropriate address area after the firmware updating.

* * * * *